US006743845B2

(12) United States Patent
Tate et al.

(10) Patent No.: US 6,743,845 B2
(45) Date of Patent: Jun. 1, 2004

(54) ORIENTED HIGH DENSITY POLYETHYLENE FILM, COMPOSITIONS AND PROCESS SUITABLE FOR PREPARATION THEREOF

(75) Inventors: Richard F. Tate, Mason, OH (US); James V. Krohn, Lake Jackson, TX (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 10/464,276

(22) Filed: Jun. 18, 2003

(65) Prior Publication Data

US 2003/0212175 A1 Nov. 13, 2003

Related U.S. Application Data

(62) Division of application No. 09/925,818, filed on Aug. 9, 2001.

(51) Int. Cl.$^7$ .................................................. C08K 5/09
(52) U.S. Cl. ....................... 524/284; 524/322; 525/386; 525/333.7; 526/352
(58) Field of Search ................................. 524/284, 322; 525/333.7, 386; 526/352

(56) References Cited

U.S. PATENT DOCUMENTS

| 4,626,252 | A | * | 12/1986 | Nishizawa et al. | ......... 604/370 |
| 4,704,238 | A | | 11/1987 | Okuyama et al. | |
| 4,774,277 | A | | 9/1988 | Janac et al. | |
| 5,378,747 | A | | 1/1995 | Willco et al. | |
| 5,420,185 | A | * | 5/1995 | Watanabe et al. | ........... 524/210 |
| 6,092,554 | A | | 7/2000 | Pyle et al. | |

FOREIGN PATENT DOCUMENTS

| EP | 0 326 181 | 1/1989 |
| WO | WO 94/06849 | 9/1993 |
| WO | WO 99/54400 | 4/1999 |

* cited by examiner

Primary Examiner—William Cheung
(74) Attorney, Agent, or Firm—Brooks Kushman P.C.

(57) ABSTRACT

The draw ratio and/or rate of stretch of HDPE in film orientation can be increased, or the breakage frequency at a given draw ratio and draw rate decreased by the addition of an orientation improving amount of a normally solid fatty carboxylic acid having a melting point lower than the orientation temperature of the film.

8 Claims, No Drawings

ORIENTED HIGH DENSITY POLYETHYLENE FILM, COMPOSITIONS AND PROCESS SUITABLE FOR PREPARATION THEREOF

This is a divisional of copending application(s) Ser. No. 09/925,818 filed on Aug. 9, 2001.

BACKGROUND OF THE INVENTION

1. Field of the Invention

The present invention pertains to oriented film of high density polyethylene, to compositions suitable for the preparation thereof, and to a process for its preparation.

2. Background Art

Polyethylene is available in numerous forms required of the various and distinct end uses for which it is destined. Polyethylene may be roughly divided into low density and high density grades. Within each grade, polyethylene may exhibit a variety of melt temperatures, melt flow ratios, melt viscosities, and the like. The physical properties of each type of polyethylene must be closely tailored to the specific end use; otherwise processing becomes problematic or even impossible. Thus, it is impossible, in general, to employ a polyethylene composition tailored for one type of processing in another type of processing. For example, low density polyethylene (LDPE) is widely used for preparation of films, and finds uses in such items as cargo wrap and plastic refuse bags. LDPE is relatively easy to formulate for such uses, and may contain numerous ingredients in addition to LDPE itself, i.e., pigments, UV absorbers, thermal stabilizers, plasticizers, lubricants, etc.

Oriented high density polyethylene (HDPE) is an altogether different product, and is formulated differently than its LDPE relative. By orienting HDPE, the strength and stiffness properties are markedly improved. As a result, stronger, and optionally thinner films may be prepared. The higher density and, in general, different physical properties of HDPE require different processing considerations, and orientation adds additional complexity. Oriented HDPE is generally extruded as a film, and water quenched. Films may also be chill roll cast, or blown and air quenched. The film is then uniaxially or biaxially stretched, optionally followed by annealing. The stretching operation takes place below the melt temperature, and may be termed a "hot stretch." The stretching operation must take place without any substantial likelihood of breakage, as breakage requires that the entire orientation process be restarted, increasing process downtime and greatly increasing cost.

A variety of different types of HDPE may be successfully oriented as film, and such HDPE is commercially available. However, oriented film produced from such compositions is not necessarily optimal for certain applications, and thus improvements in HDPE oriented film are desirable. Moreover, up till now, solution processed HDPE has proven to be extremely difficult to prepare as oriented film. Solution-polymerized HDPE is prepared by polymerizing ethylene in solution, following which the solvent is removed and the polymer is pelletized. Solution-polymerized HDPE tends to stretch inconsistently, and thus the rate and/or amount of stretch must be decreased in order to orient the film without breaking, if orientation can be performed at all. Decreasing the amount of stretch generates a product having different and generally less desirable physical properties, while decreasing the rate of stretch results in increased production time and cost.

SUMMARY OF THE INVENTION

The present invention pertains to an HDPE composition containing a normally solid, long chain carboxylic acid having a melting point below the orientation temperature of the HDPE film. The compositions, even when employing solution-polymerized HDPE, have been found to stretch at commercially useful rates and stretch ratios without undue breakage. For HDPE which can be stretched without additives, adding long chain carboxylic acids lowers further the already low frequency of breakage occurring during commercial manufacturing processes, and may result in higher physical properties as a result of greater uniformity in the stretching operation.

DETAILED DESCRIPTION OF THE PREFERRED EMBODIMENT(S)

The HDPE used in the present invention is that conventionally recognized as HDPE by the skilled artisan, i.e., polyethylene homopolymers or copolymers having a density of from 0.94 to 0.965. In general, copolymeric HDPE contains 20 weight percent or less, particularly 10% by weight or less of copolymerizable comonomers. Suitable comonomers are well known in the art, with preferred comonomers being butene, hexene, and octene. The polyethylene may be made by conventional catalysts, i.e., of the Ziegler-Natta type, or may be made employing a wide variety of single site catalysts, for example STAR™ ethylene polymerization catalysts developed by EQUISTAR, Cincinnati, Ohio. Processes for preparing HDPE include all those in common use, including gas phase, slurry, and solution processes. Solution processed polyethylene is the preferred polyethylene in the present application. The resultant polyethylene, optionally including thermal and/or UV stabilizers, is commonly extruded and pelletized to form a polyethylene "raw material".

The HDPE polyethylene raw material is extruded through a die into film. Prior to or while in the extruder, the HDPE raw material is compounded with any additional ingredients, generally including dyes and/or pigments, thermal and/or UV stabilizers, etc. These may be dosed into the extruder by themselves, or in master batches of HDPE containing larger than desired amounts of additives. Alternatively, master batches containing the desired ingredients may be mixed in the appropriate proportions with the HDPE raw material prior to entry into the extruder. The HDPE preferably contains no fillers, especially fillers which would cause disruption of the film such as the formation of voids.

In the present invention, the ability to stably orient extruded polyethylene films is induced or augmented by the addition of a small quantity of a normally solid carboxylic acid, one having a melting point below the film orientation temperature, preferably stearic acid, palmitic acid, or mixtures thereof, and most preferably, palmitic acid alone. Other low melting but normally solid fatty carboxylic acids may be used as well, one example being lignoceric acid. While the fatty carboxylic acids may contain ethylenic unsaturation, they must be normally solid, i.e. solid at 25° C. Thus, numerous common unsaturated fatty acids such as oleic acid, linoleic acid, and linolenic acid are not suitable for use herein, although they may find themselves useful as lubricants or plasticizers in very small amounts. The preferred fatty acids are saturated fatty acids, most preferably linear fatty acids such as occur in natural products, preferably natural products of vegetable origin.

The manner in which the normally solid, low melting fatty acid functions is not known with certainty. Without wishing to be bound to any particular theory, it is presently believed that the long chain fatty acids, having a structure similar to polyethylene, is able to be homogeneously dispersed in the polyethylene, where it functions to allow greater mobility between adjacent polyethylene polymer chains. The greater mobility is thought to reduce the inconsistencies otherwise associated with the orientation of polyethylene polymers.

The amount of solid, fatty acid is an amount effective to allow orientation without undue breakage, while maintaining desirable end properties. The actual amount is dependent to some degree on the particular HDPE, and thus may vary. However, the amount is virtually always less than 1% by weight (10,000 ppm), more preferably from about 200 ppm to 5,000 ppm, yet more preferably between 500 ppm and 3,000 ppm, and most preferably about 2,000 ppm, these weights in parts per million based on the sum of the weights of the polyethylene and the carboxylic acid in the finished composition. It should be noted that in addition to facilitating orientation, many of the properties of the oriented film are improved as well.

The solid, fatty acid is preferably supplied as a master batch, dispersed in the same or another HDPE. In certain circumstances, LDPE, LLDPE or other polyethylene homopolymers or copolymers may be introduced as well. Preferred master batches contain stearic acid or palmitic acid at a level of from 1 weight percent to 5 weight percent, preferably 1 weight percent to 3 weight percent, and most preferably 1.5 to 2.5 weight percent. The polyethylene used in the master batch may be the same or different from the polyethylene to which the master batch will be added, but is preferably the same or substantially similar. Suitable base resins include, in a non-limiting sense, the Alathon® polyethylene resins manufactured by Equistar Corporation, including L5845 with a melt index of 0.45 and density of 0.958 g/cm$^3$; L5045, with a melt index of 0.45 and a density of 0.950 g/cm$^3$; LT618072, with a melt index of 1.0 and a density of 0.960 g/cm$^3$; PE4829, with a melt index of 0.34 and a density of 0.944 g/cm$^3$; and L5885 with a melt index of 0.85 and a density of 0.958 g/cm$^3$. These are illustrative and not limiting.

The master batches are generally prepared conventionally in a single screw or twin screw extruder, although other devices such as Henschel mixers, Banbury mixers, Brabender mixers and other mixers may also be used. The carboxylic acid is generally mixed in at relatively low shear, and thus for a resin with a melt temperature below 285° F. (140° C.), temperatures of 360° F. (182° C.) to 400° F. (204° C.) are suitable, although higher or lower temperatures may be used as well. The master batches preferably contain no stearates such as zinc stearate. Following mixing, the master batch is generally granulated.

The master batch is added to the desired HDPE in an amount sufficient to provide the necessary resistance to breaking during film orientation, for example 2,000 ppm relative to the final HDPE product. The HDPE is extruded into film and generally quenched by conventional processing methods, i.e. by chill rolls, air quenching, water quenching, etc. Following film preparation, the film may optionally be slit, i.e., for forming tape, and is uniaxially or biaxially oriented. The orientation takes place at a temperature which is preferably above the line drawing temperature, and below the melt temperature. If necking can be tolerated, lower temperatures may be used.

The term "line drawing temperature" refers to the temperature above which uniform orientation is obtained, as is known in the art. The line drawing temperature and melting temperature can be determined experimentally. When the film is stretched at temperatures low enough for line drawing, a "line" or "neck" develops in the film, perpendicular to the direction of stretch once the yield point has been reached. Stretching then starts from this thinned-out region until an elongation equal to the natural stretch ratio of the film is achieved, for the particular stretch rate used. If a series of film samples is stretched under conditions of line-drawing at a set of increasingly higher temperatures, starting at room temperature, a series of decreasingly sharp maxima will result in the corresponding stress-strain curves. At some higher temperature, a maximum no longer appears in the stress-strain curve, and line drawing has ceased. At this temperature or higher temperatures, the film undergoes more uniform stretching over its length and no longer displays a line or neck during elongation. A more detailed discussion may be found in "Polyethylene" by Renfrew and Morgan, 2d edition, pages 170–2, published in 1960 by Interscience Publishers, Inc. New York.

The line-drawing temperature can change. For example, a film has a given line drawing temperature before stretching. However, after stretching in one direction, e.g., the machine direction, the line-drawing temperature of the film in the direction perpendicular to the direction of stretch, e.g., the transverse direction, is higher than the given temperature. This difference in temperatures should be taken into consideration in order to provide biaxial stretching at the proper stretching temperature when stretching in the machine direction and transverse stretching are not performed simultaneously.

The stretching may occur in conventional devices, i.e., between a series of pairs of counter-rotating rollers, the temperature of which may vary from roll-to-roll. The initial pair of counter-rotating rollers revolve at a lower rate than the last pair, or "exit rollers," with pairs of rollers inbetween revolving at intermediate rates. Thus, the exit speed of the film is higher than the input speed and the film is stretched accordingly. The term "stretch ratio" is the ratio of a length of a sample of the film in the orientation direction, after stretching, compared to the original length of the film in the orientation direction, before stretching. The "stretch rate" is the rate of change in length of the stretched film over time. The stretch ratio may be adjusted to the desired level, i.e., one which achieves the desired tensile strength, generally a stretch ratio between 3 and 6, more preferably between 3.5 and 5, and most preferably in the range of 4.0 to 4.5, by increasing the relative differences in revolving rates of the input and exit rollers.

The optimum temperature for stretching will depend on the particular polyethylene or blend of polyethylenes selected. As indicated, when stretching the films, it is necessary for the film temperature to be below the melt temperature point and above the line drawing temperature. In practice, the actual sheet or film temperature is not usually measured. Instead, what is measured is, for example, the temperature of the fluid used to heat orienting rolls in a machine direction orienter, or the air temperature in a tenter frame oven.

For example, the rollers may be contained within a stretch oven, which is preferably maintained at a temperature above the melt temperature of the polyethylene. Because of the speed of travel of the web through the oven, however, the film temperature never rises above the melt temperature, and thus the stretching takes place in the solid state. The orientation temperature may be up to just less than the melt temperature, generally about 130° C., but is preferably below 125° C., more preferably in the range of 80° C. to 120° C., and most preferably 100° C. to 115° C.

If biaxial orientation is desired, the film is not slit prior to stretching (but may be slit afterwards), and enters the oven in a tenter frame, as shown in FIGS. 2 and 3. A series of clamp-like devices clamp onto the edges of the film and move apart relative to each other both in the transverse and lateral directions. The film is thus stretched both across its width (transverse) and along its length (laterally). The stretch ratio may be the same or different in these directions. A combination of roller stretching (monoaxial) and transverse stretching in a tenter frame may also be employed, or any combination. Following stretching, whether monoaxial or biaxial, the resulting film or tape is optionally annealed in the annealing oven. Following exit from the optional annealing oven, the product may be wound onto rolls or bobbins (i.e., for tape), may be woven, and/or laminated to other films. The tape may be woven into woven products. The oriented product has high tensile strength due to the stretching operation below the melt temperature, and is a coherent product, for example exhibiting a lack of microvoids.

Having generally described this invention, a further understanding can be obtained by reference to certain specific examples which are provided herein for purposes of illustration only and are not intended to be limiting unless otherwise specified.

EXAMPLE 1 AND COMPARATIVE EXAMPLES C1–C4

A master batch of 2 weight percent palmitic acid in a solution-type polyethylene homopolymer (Alathon® L5885 polyethylene) with a melt index of 0.85 and a density of 0.958 is preferred, by mixing the ingredients under low shear at 360° F. to 400® F. until a homogenous product is obtained. The master batch is then extruded and pelletized. Films of Alathon® L5885 polyethylene base resin with and without palmitic acid derived from the master batch are air blown and quenched. The properties of the films as prepared (non-oriented), and at stretch ratios of 4:1 and 5:1 are measured. The results are presented in Table 1.

TABLE 1

| Example | C1 | C2 | C3 | C4 | 1 |
|---|---|---|---|---|---|
| Palmitic Acid | 0 | 0 | 0 | 2000 | 2000 |
| Film Type | Not Oriented | Oriented 4:1 | Oriented 5:1 | Not Oriented | Oriented 5:1 |
| Gauge (mil) | 4.13 | 1.1 | 0.92 | 4.02 | 1.0 |
| Dart Drop (F50) | 183 | <36 | <36 | 186 | <36 |
| Elmendorf Tear (MD/TD)[1] | 80/440 | 6/Breaks MD | 5/410 | 78/440 | 5/350 |
| Gloss (units) | 5.9 | 17 | 23 | 5.8 | 30 |
| Haze (%) | 81 | 54 | 44 | 81 | 34 |
| 1% Secant Modulus (psi) (MD/TD) | 151340/203960 | 258590/258590 | 346170/281540 | 148500/198030 | 360660/274570 |
| Puncture (Newtons) | 91.1 | 13.2 | 9.7 | 94.3 | 13 |
| TEDD | 1.5 | 0.44 | 0.44 | 1.5 | 0.52 |
| Yield (psi) (MD/TD) | 4290/4850 | 15600/4400 | 28400/3920 | 4210/4630 | 30300/3040 |
| Elongation at Yield (%) (MD/TD) | 10/5 | 20/3 | 19/2 | 11/5 | 19/2 |
| Break (psi) (MD/TD) | 5970/4220 | 17100/2520 | 20800/3320 | 6330/5510 | 23600/3290 |
| Elongation at Break (%) MD/TD | 740/640 | 110/15 | 36/6 | 790/980 | 31/4 |
| WVTR (g/m²/day) | 0.76 | 1.84 | 2.19 | 0.64 | 2.22 |

[1]MD = machine direction;
TD = transverse direction

The results presented in Table 1 illustrate the improvement in orientation obtainable through use of the low melting, normally solid fatty acids of the present invention. Particularly noteworthy is the decrease in haze, the increase in elongation at yield, and the tensile strength at break. The amount of haze is related to the ability of the film to stretch uniformly. The greater the uniformity, the less haze. Solution processed polyethylene, for example, stretches inconsistently, producing considerable haze. Products with less haze are also viewed more favorably by the purchaser. The addition of only 2000 ppm palmitic acid lowered the relative amount of haze by approximately 25 percent.

At the same time, the tensile strength at break in the machine direction is increased by ca. 10%, even though the film is slightly thinner (1.0 mil versus 1.1 mil). This increase in breaking strength, and the improvement in haze, are accomplished without significantly affecting other properties such as elongation at yield or Elmendorf tear strength. The puncture strength shows significant improvement as well.

A further indication of the ability of the low melting, normally solid fatty acids of the subject invention to improve processing is the "TM Long" Test, a non-standard test where necking-in is prevented by maintaining the edges of the film at a fixed distance during longitudinal stretch. This test is particularly sensitive, and allows observation of effects which less sensitive tests do not.

EXAMPLES 2. C5 AND C6

Films of Alathon® L4903 polyethylene resin with a density of 0.949 and a melt index of 0.027 was oriented using the "TM Long" test described above. In the comparative example, no processing aid was added. In the subject invention example, 2000 ppm palmitic acid was included in the formulation. The results are presented in Table 2 below. The orientation was performed at 110° C.

TABLE 2

| Example | Palmitic Acid | Draw Ratio | Draw Rate | Comments |
| --- | --- | --- | --- | --- |
| C5 | None | 4.0:1 | 70 mm/s | Broke |
| C6 | None | 4.0:1 | 40 mm/s | OK |
| 2 | 2000 ppm | 4.0:1 | 70 mm/s | OK |

The results in Table 2 indicate that the HDPE with no processing aid could be stretched at a draw ratio of 4.0:1 and a draw rate of 40 mm/s. However, at a higher draw rate of 70 mm/s, the film broke. By adding 2000 ppm palmitic acid, the film could be satisfactorily stretched at a draw rate of 70 mm/s.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A substantially microvoid-free oriented HDPE film having a draw ratio in excess of 3, said film free of metal stearates, and comprising a) HDPE having a density from 0.94 to 0.965 g/cm$^3$, and b) from 0.02 to 1 weight percent of a normally solid fatty carboxylic acid having a melting point below the temperature at which said film was oriented, said weight percent relative to the sum of a) and b).

2. The film of claim 1, wherein said fatty carboxylic acid is selected from fatty carboxylic acids having melting points between 60° C. and 100° C.

3. The film of claim 1, wherein said fatty carboxylic acids are selected from stearic acid, palmitic acid, lignoceric acid, and mixtures thereof.

4. The film of claim 1, wherein said fatty carboxylic acid is palmitic acid.

5. The film of claim 1, wherein said orientation temperature is below 120° C.

6. A master batch for addition to HDPE to increase the amount or rate of stretch without breakage or to decrease the frequency of breakage at a given amount and rate of stretch, said master batch being free of metal stearates, and comprising HDPE or a mixture of HDPE and another polyethylene homo- or co-polymer of lower density, and from 1.5 to about 5 weight percent of a normally solid fatty carboxylic acid having a melting point less than 100° C.

7. A master batch for addition to HDPE to increase the amount or rate of stretch without breakage or to decrease the frequency of breakage at a given amount and rate of stretch, said master batch being free of metal stearates, and comprising HDPE or a mixture of HDPE and another polyethylene homo- or co-polymer of lower density, and one solid fatty acid component consisting of from 1.5 to about 5 weight percent of one or more normally solid fatty carboxylic acids having a melting point less than 100° C.

8. The master batch of claim 7, wherein the only fatty carboxylic acids present are selected from the group consisting of stearic acid, palinitic acid, and mixtures thereof.

* * * * *